United States Patent [19]

Quick et al.

[11] 4,211,313
[45] Jul. 8, 1980

[54] TRANSMISSION BRAKE WITH LUBRICATING AND COOLING MEANS

[75] Inventors: David C. Quick, New Berlin; James E. Marsch, Brookfield, both of Wis.

[73] Assignee: Allis-Chalmers Corporation, Milwaukee, Wis.

[21] Appl. No.: 863,451

[22] Filed: Dec. 22, 1977

[51] Int. Cl.² .................. B60K 41/20; F16D 65/82
[52] U.S. Cl. ........................ 192/4 A; 192/113 B; 192/18 A
[58] Field of Search ............ 192/4 A, 113 B, 18 A; 74/339; 188/264 F, 264 E, 71.6

[56] References Cited

U.S. PATENT DOCUMENTS

| | | | |
|---|---|---|---|
| 2,407,699 | 9/1946 | Hill | 188/264 F |
| 2,778,451 | 1/1957 | Friedman | 188/218 X L |
| 2,875,872 | 3/1959 | Backus | 192/3.51 |
| 2,924,126 | 2/1960 | Isaacson et al. | 192/4 A |
| 2,943,719 | 7/1960 | McNamara et al. | 192/4 A |
| 3,309,934 | 3/1967 | Gustafsson et al. | 74/339 |
| 3,780,762 | 12/1973 | Matthews et al. | 192/4 A |
| 3,924,717 | 12/1975 | Ookubo et al. | 192/113 B |
| 4,027,758 | 6/1977 | Gustavsson et al. | 188/264 E |

FOREIGN PATENT DOCUMENTS 2449195  4/1976  Fed. Rep. of Germany .......... 188/71.6

Primary Examiner—George H. Krizmanich
Attorney, Agent, or Firm—Arthur L. Nelson

[57] ABSTRACT

A transmission brake with a lubricating and cooling means whereby a portion of the actuating fluid is used to cool the transmission brake and lubricate the brake disks while the transmission brake is operated.

10 Claims, 3 Drawing Figures

TRANSMISSION BRAKE WITH LUBRICATING AND COOLING MEANS

This invention relates to a transmission brake and more particularly to a lubricating and cooling means whereby a portion of the hydraulic actuating fluid in the pressurizing chamber of the hydraulic actuator is vented to lubricate and cool the brake disks of the vehicle transmission brake.

Vehicle transmission brakes are used in conjunction with a clutch of the vehicle transmission to assist in synchronizing of the gears as the vehicle transmission is shifted. Normally, the manually shifted transmission is shifted while the vehicle is stationary. Accordingly, the output shaft which drives the rear wheels is stationary and if the engine is running, the input shaft may be rotating because of inertia or frictional drag even though the clutch between the engine and the transmission is disengaged. When the clutch is disengaged, inertia tends to keep the input shaft and connected gears rotating, and, accordingly, in order to shift the transmission, this rotation may be overcome by a vehicle transmission brake.

The manually shifted transmission may be used in conjunction with a range shift transmission positioned between the output shaft of the manually shifted transmission and the rear drive assembly. A power shift transmission which usually is positioned ahead of the manually shifted transmission may also be used. These auxiliary transmissions provide a means for multiplying the gear ratios of the main manually shifted transmission.

To facilitate shifting of the transmission, synchronizers are used and/or a vehicle brake to brake the rotating gears and shafts such as in a countershaft transmission. For the purpose of illustration, a countershaft transmission which is manually shifted is illustrated in this application. Although a plurality of power shift clutches may be used with a transmission of this type, only a single clutch is illustrated to illustrate the applicant's invention. The applicant's invention provides for a brake on the countershaft of a countershaft transmission which overcomes the rotational inertia of the countershaft to facilitate shifting of the manual transmission. The transmission brake is a wet disk type brake which requires lubrication of the brake disks. Normally, a wet disk type brake runs in hydraulic fluid so that the brake disks are lubricated by hydraulic fluid during operation. Since provision of hydraulic cooling fluid for the brake is not always available in a transmission design, this invention provides for a means whereby the hydraulic fluid for actuating of the transmission brake can be bled through a vent in the piston of the hydraulic actuator for cooling. The amount of fluid vented to the brake disk is optional depending upon the design of the transmission brake. The brake disks are provided with grooves to allow the flow of the hydraulic actuating fluid onto the brake disks for lubricating the brake disks to provide a wet disk brake and also the fluid is provided for cooling of the transmission brake during operation. Accordingly, the hydraulic fluid serves the function of actuating the brake, lubricating of the brake disks and cooling of the transmission brake when the transmission brake is actuated.

It is an object of this invention to provide a fluid cooled transmission brake cooled by actuating fluid from the hydraulic actuator in the brake.

It is another object of this invention to provide a transmission brake, have a cooling means of venting of the hydraulic actuating fluid to the brake disks for cooling of the vehicle transmission brake.

It is a further object of this invention to provide a transmission brake having cooling means whereby the hydraulic piston in the hydraulic actuator is provided with a vent to allow the actuating fluid to flow onto the brake disks which are fluted and allow the hydraulic fluid to lubricate and cool the brake disks as the hydraulic brake is actuated.

The objects of this invention are accomplished by providing venting means in a hydraulic actuator for actuating the transmission brake. The transmission brake is a wet disk brake and the hydraulic fluid operates as a lubricant for the brake while simultaneously cooling the brake by dissipating the heat generated in the brake. Normally, the transmission clutch is disengaged by a clutch and transmission brake pedal and further depressing of the pedal will actuate the transmission brake to decelerate the rotational movement of the components in the transmission. This will assist in the shifting of the manual transmission by the operator. The venting of the actuating fluid for actuation of the vehicle brake through the hydraulic piston in the hydraulic actuator allows the hydraulic fluid to flow through the brake and fluid grooves in the friction material on the brake disks. The hydraulic fluid flows around the brake disks and dissipate heat from the brake as it flows from the brake assembly.

Figure 1:
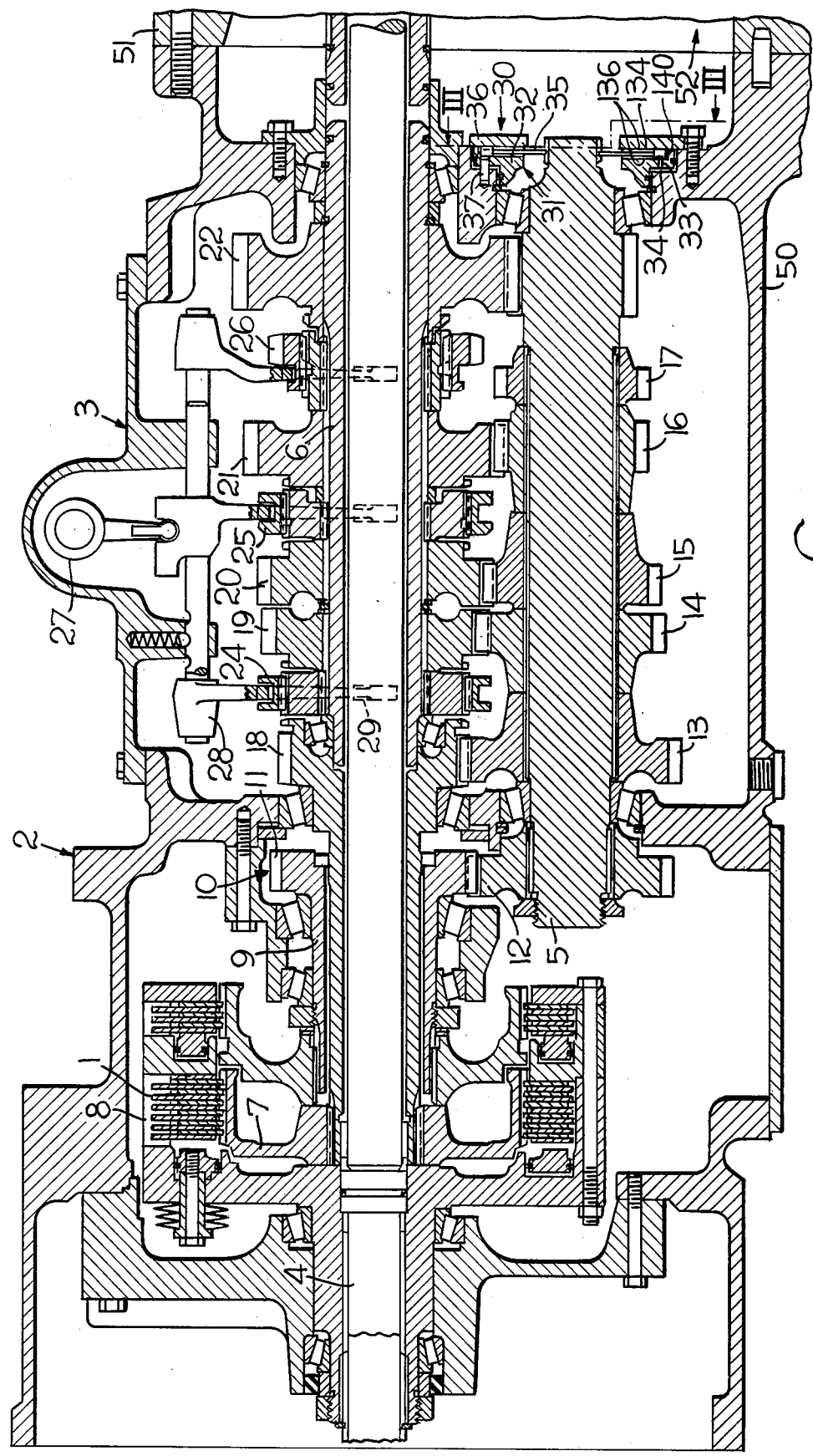
FIG. 1 is a cross section view of the transmission brake and a portion of the transmission showing the mounting of the brake in the transmission.
Figure 2:
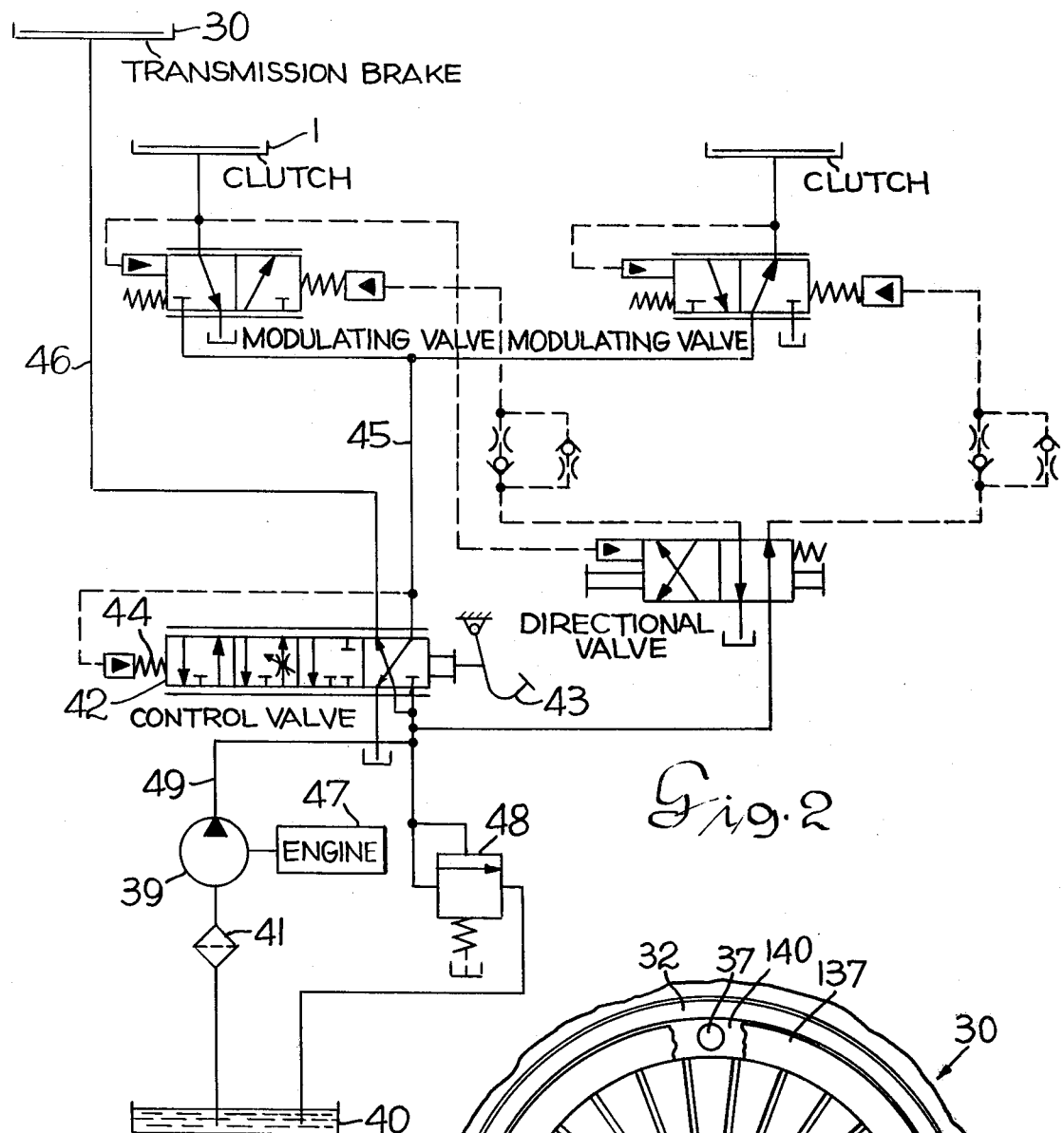
FIG. 2 is a schematic diagram of the vehicle transmission clutches and brake and a schematic illustration of the hydraulic circuit operating the clutches and brake in the transmission.

Referring to the drawings, the preferred embodiment of this invention is illustrated:

FIGS. 1 show a clutch 1 for driving through the main transmission 2. The main transmission 2 includes the input shaft 4 and a countershaft 5 and an output shaft 6. The clutch 1 is selectively engaged to drive from the input shaft 4 through the clutch drum 8 and the clutch hub 7 which is connected to the quill shaft 9. The quill shaft 9 drives through the countershaft gearset including gear 18 and gear 13. Gear 11 drives the countershaft 5 which carries the gears 12, 13, 14, 15, 16 and 17. The countershaft gears drive into main gears 19, 20, 21 and 22. The clutch sleeves 24, 25 and 26 are selectively operated by the shift rails carrying shifting forks operated by the shift lever 27. Shift rail 28 is shown connected to the shifting fork 29 operated by the shift lever 27 which illustrates the manual shifting mechanism of the transmission. The transmission brake 30 includes the hydraulic actuator 31 having a piston 32. The piston 32 is formed with a vent 33 allowing hydraulic fluid to flow from the pressurizing chamber 34 into lube chamber 140 when the brake is actuated. The brake disk 35 is formed with oil grooves 136 allowing fluid to flow from the lube chamber radially inward. The reaction plate 36 and piston 32 receive reaction force from actuation of the transmission brake. The wave spring 137 returns the piston to its retracted position. The pin 37 transmits reaction force on the piston 32 to housing 50.

The hydraulic system includes a pump 39 receiving hydraulic fluid from the reservoir 40. The filter 41 filters the fluid as it is received by the pump 39. The control valve 42 is operated by the clutch and brake pedal 43. Normally, the control valve 42 is biased in the right-hand direction against the pedal 43 by the spring 44. The control valve 42 is shown as a four position valve with the clutch engaged when the pedal is in the returned position and the brake engaged when the clutch and brake pedal is fully depressed.

The conduit 45 transmits hydraulic fluid to clutch 1. The conduit 46 transmits hydraulic fluid to the brake 30. Fluid is selectively returned to the sump 40 through the control valve. The pedal selectively operates the clutch 1 or brake 30 through the control valve 42. The engine 47 drives the pump 39 and the relief valve 48 vents hydraulic fluid to the sump 40 to maintain a predetermined pressure in the conduit 49.

Figure 3:
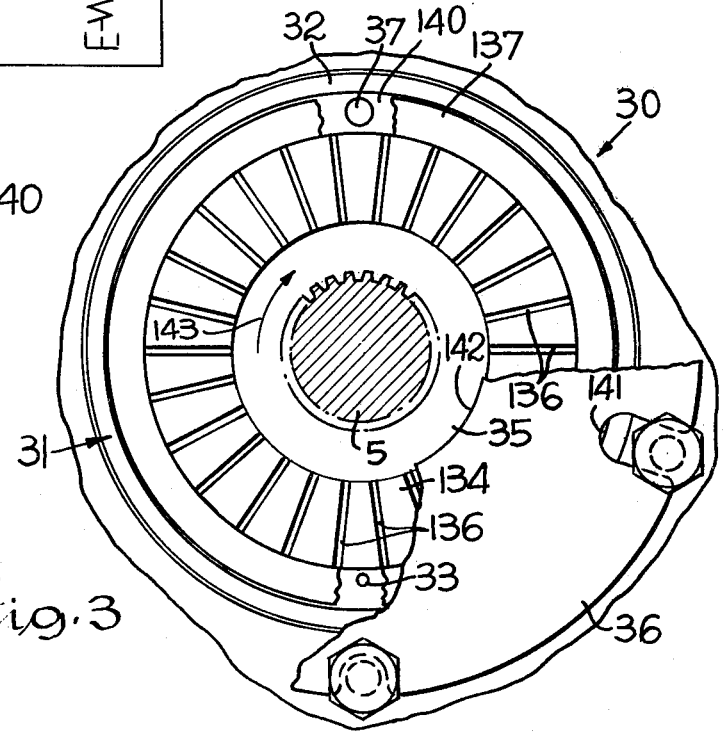
FIG. 3 is a partially sectioned end view of the transmission brake.

The vehicle transmission brake is shown in FIG. 3. The transmission housing 50 is connected to the transfer casing 51. The gears in the transfer case do not run in oil and the chamber 52 does not carry an oil reservoir for cooling of the transmission brake. Accordingly, the vent 141 in the hydraulic piston 31 is provided to vent fluid from the pressurizing chamber 34. The fluid is carried around chamber 140 in the direction of the arrow 143 to the vent opening 141 where it is drained to chamber 52. A sufficient amount of fluid is supplied to lubricate the brake disk 134 which is fixed to the countershaft 5 by a spline connection. Rotation of the brake disk and frictional engagement with the reaction plate 36 and piston 31 generate heat which is dissipated by the flow of the fluid from the pressurizing chamber and which is allowed to flow through the oil grooves 136 on the brake disk 134. The fluid is also drained through opening 141 into the chamber 52 and is eventually returned to sump. In this manner, the brake is cooled during normal operation of the transmission brake.

The operation of the device will be described in the following paragraphs.

The vehicle clutch 1 in the transmission 2 is hydraulically operated through the hydraulic circuit 60. The engine 47 drives the pump 39 to pressurize fluid in the conduit 49. The control valve 42 is selectively operated by the brake and clutch pedal 43. The brake and clutch pedal 43 is normally returned to the counterclockwise position as shown. In this position, the clutch 1 is engaged and the power can be transmitted through the transmission.

When it is desired to shift gears of the transmission, the clutch and brake pedal 43 is depressed and rotated in a clockwise direction. The pedal is rotated to the position in which the brake 30 is partially engaged and in this position the brake 30 partially brakes the rotation of the countershaft 5. The countershaft 5 can be slowly rotated so that one of the gearsets between the countershaft and the output shaft can be selectively engaged by the shift lever 27. When the shift lever is engaged, the brake and clutch pedal 43 is released. This in turn releases the brake and allows the clutch 1 to become engaged. When the clutch is fully engaged, the transmission is then operating to drive the vehicle. The selected gear and the clutch drive through a conventional rear drive assembly to drive the vehicle.

The embodiments of the invention in which an exclusive property or privilege is claimed are defined as follows:

1. A vehicle transmission including a hydraulic brake comprising, a vehicle transmission including a driving shaft, a transmission brake including a brake disk connected to said shaft, a hydraulic actuator defining a pressurizing chamber for actuating the brake, a hydraulic piston for engaging said brake disk and defining restricted flow passage means from said pressurizing chamber to said brake disk, a brake housing defining a peripheral fluid chamber around said brake disk for receiving fluid from said restricted flow passage means, a reaction plate for frictionally engaging said brake disk, friction material on said disk defining groove means for radial flow of hydraulic fluid from said peripheral fluid chamber during brake actuation, a fluid venting means in communication with the peripheral chamber for venting the fluid from said brake thereby providing cooling of said brake with actuating fluid when said brake is actuated.

2. A vehicle transmission including a hydraulic brake as set forth in claim 1 wherein said friction material of said brake defines radial grooves extending across the friction material on said brake disk.

3. A vehicle transmission including a hydraulic brake as set forth in claim 1 wherein said hydraullic piston defines said restricted flow passage on the radial outer portion of said hydraulic piston.

4. A vehicle transmission including a hydraulic brake as set forth in claim 1 including a hydraulic system, a brake and clutch pedal operating a control valve for selectively operating a clutch and said brake, a hydraulic clutch in said transmission for selectively transmitting drive through said transmission operated by said clutch and brake pedal.

5. A vehicle transmission including a hydraulic brake as set forth in claim 1 including a return spring in said peripheral fluid chamber.

6. A vehicle transmission including a hydraulic brake as set forth in claim 1 wherein said transmission includes an input shaft, a gearset on said input shaft and said driving shaft for driving said driving shaft, said driving shaft defines a countershaft, an output shaft, a plurality of gearsets connected between said countershaft and said output shaft for selectively driving said output shaft, mechanical means for selectively engaging said gearsets for shifting said transmission, a hydraulic clutch connected to said input shaft for selectively driving said input shaft and said countershaft for driving said transmission.

7. A vehicle transmission including a hydraulic brake as set forth in claim 1 including an input shaft, a gearset connecting said input shaft to said driving shaft, a hydraulic clutch connected to said input shaft for selectively driving said input shaft for driving said transmission.

8. A vehicle transmission including a hydraulic brake as set forth in claim 1 including an output shaft, a plurality of gearsets connected between said driving shaft and said output shaft, means for selectively shifting said gearsets for selective drive between said driving shaft and said output shaft.

9. A vehicle transmission including a hydraulic brake as set forth in claim 1 wherein said peripheral fluid chamber in said transmission brake defines a peripheral clearance for receiving hydraulic fluid from said restrictive flow passage in said hydraulic piston for flow of hydraulic fluid through said hydraulic brake.

10. A vehicle transmission including a hydraulic brake as set forth in claim 1 wherein said housing defining said peripheral fluid chamber forms a radially outer peripheral chamber and a limited venting means.

* * * * *